O. Child,
Circular Saw Mill.
N° 7,832.    Patented Dec. 17, 1850.
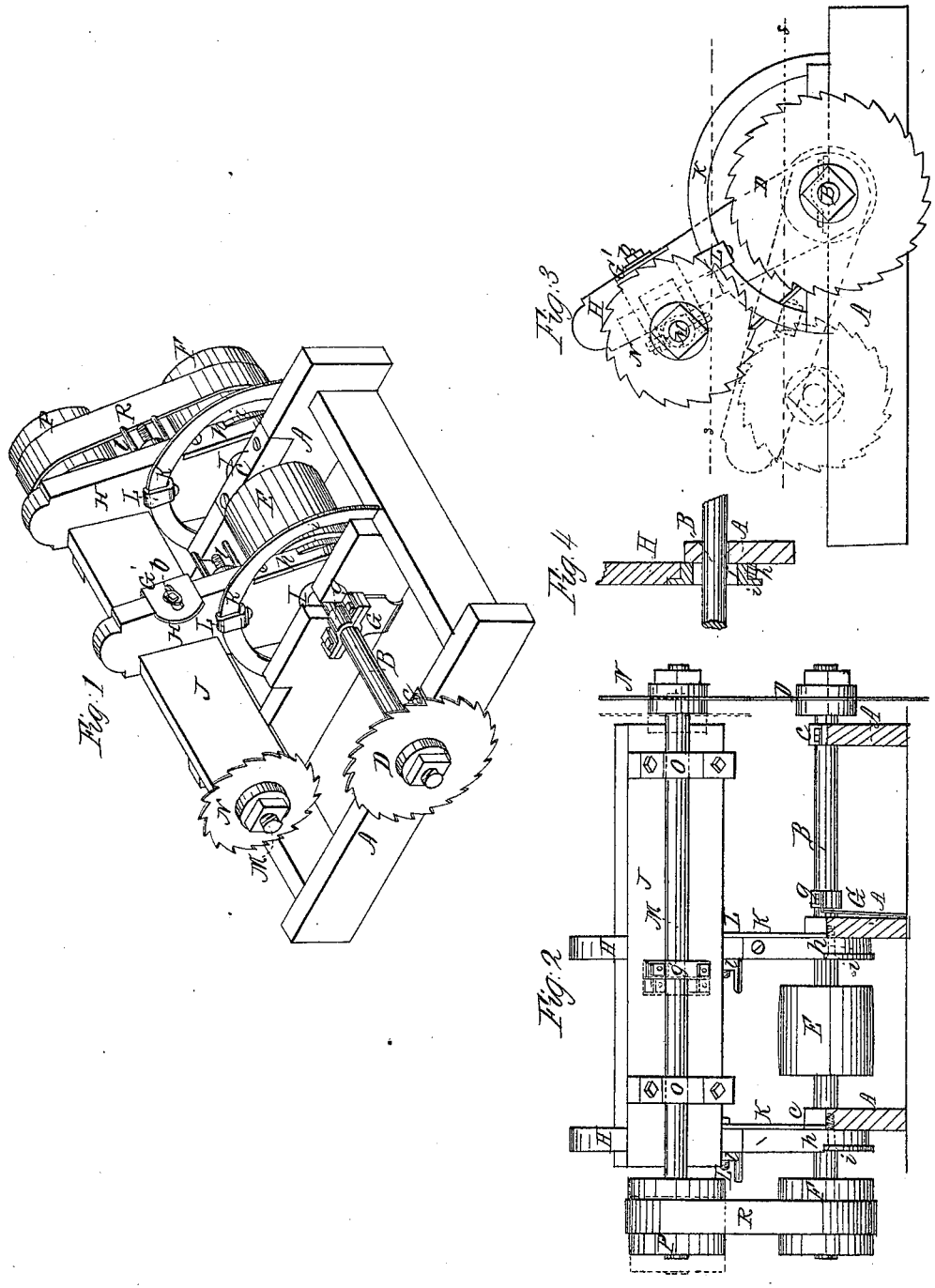

UNITED STATES PATENT OFFICE.

O. CHILD, OF GRANVILLE, ILLINOIS.

MILL FOR SAWING WITH CIRCULAR SAWS.

Specification of Letters Patent No. 7,832, dated December 17, 1850.

*To all whom it may concern:*

Be it known that I, ORLANDO CHILD, of Granville, in the county of Putnam and State of Illinois, have invented certain new and useful Improvements in Machinery for Sawing Timber, &c.; and I do hereby declare that the following is a full, clear, and exact description of the same, reference being had to the accompanying drawings, forming part of this specification, in which—

Figure 1 is a perspective view taken at the back of the saws in such a position as best shows my improvement—Fig. 2 is a front elevation—Fig. 3 is a side elevation—Fig. 4 is a detached sectional view showing the manner of attaching the swinging arms.

Similar letters of reference indicate corresponding parts in each of the several figures.

The nature of my invention which applies only to machinery in which circular saws are used consists firstly of a strong spring attached to the frame, and carrying a journal box fitting to a journal turned in the spindle of the saw near its center; this spring is sufficiently strong to prevent the end play of the shaft without having collars or shoulders, on the journals working in the ordinary bearings of the spindle, but at the same time will yield to pressure on the sides of the saw occasioned by the lateral springing of the log while being cut, which pressure creating friction is the cause of the saw becoming heated and in many cases entirely ruined.

It consists secondly in the application of an additional saw having its spindle working in bearings attached to swinging arms, mounted on axes concentric with the stationary spindle and capable of being adjusted and secured at any point in a line forming part of a circle round the axis of the stationary spindle; the swinging saw may be set nearly over the stationary saw, in a line with it for the purpose of sawing through a thick log, or may be set with its center nearly in a horizontal line with the fixed center, the spindle of the swinging saw is also capable of being adjusted in the direction of its length so that the two saws may be employed at the same time cutting two boards from the same log.

To enable others skilled in the art to make and use my invention I will proceed to describe its construction and operation.

A, A, represent part of the frame of a saw-mill B, is the spindle which for destinction I will call the stationary spindle.

C, C, are the bearings in which the spindle B, rotates.

D, is the saw firmly secured on the spindle B.

E, is the main driving drum or pulley and F, is another drum or pulley both keyed on the spindle B.

G is a strong spring formed of a flat steel plate, it is secured at its lower end to the frame A, and carries at its upper end a journal box $g$, fitting to a journal turned in the spindle B.

H, H, are swinging arms attached by metal straps $h$, $h$, to circular bosses I, I, which are secured to the frame and are provided with flanges $i$, $i$, which prevent the swinging arms H, H, slipping off. The bosses are hollow to allow the spindle B to pass through them and are concentric with the said spindle; the arms H, H, fit on the said bosses so as to allow of this being easily swung in any required direction.

J, is a plank or table secured across the front of the arms H, H.

K, K, are arches formed of flat bar iron attached at each end to the frame A.

L, L, are bolts having their heads formed so as to embrace the arches K, K; these bolts pass through the arms H, H, and are provided with nuts $l$, $l$, for the purpose of securing the arms H, H, to the arches K, K, and holding them in any required position.

M, is a spindle carrying a saw N, and rotating in bearings O, O bolted to the front of the plank or table J. P is a drum or pulley fast on the spindle M.

R is a driving band for communicating motion from the spindle B, to the spindle M.

G′, is a spring attached to one of the arms H′; it is forked, each end of the fork passes through a slot in the plank or table J, and is attached to a journal box $g′$ which fits to a journal turned in the spindle M; its effect on the spindle M, is precisely similar to that of the spring G, on the spindle B; the spring G′, is attached to the arm H, by a screw bolt $b$, passing through a slot in the spring into the back of the arm by which it may be adjusted, the spindle M, passing freely through the bearings O, O, may be moved in the direction of its length so as to set the saw N, in or out of line with the saw D, as will be explained by the red lines in Fig. 2,—the direction in which the log is caused to travel is represented by strong dotted lines s, s, in Fig. 3.

The operation is as follows—if it is required to cut a log which would be too large for the saw D to cut through, the arms H, H, are raised to about the position represented in Fig. 3, the lower part of the periphery of the saw N, being set rather lower than the upper part of the periphery of the saw D, and is secured in such position by the bolt and nut L, l, when it is ready for operation. If it is required to make two cuts in a smaller log the arms H, H, are secured in the position shown by red lines in Fig. 3, bringing the saw N, almost on a level with the saw D, the spindle M, is moved in the direction of its length so as to set the saw N, the required distance in the required direction, right or left, of the saw D. The saw N, may also if required be moved to a vertical position clear of the log. Rotary motion being communicated by a band to the pulley E, or by other convenient means to the shaft B; is transmitted by the band R, to the drum or pulley P, on the spindle M, causing both saws to rotate in the same direction.

The advantage of using two small saws in the place of one large one for cutting lumber is not only in the very great saving in the cost of the saws, but also in the economy of working; the small saws being thinner will cut away less timber and run proportionally lighter and at less expense of power.

In using circular saws the lateral springing of the timber is found in many cases to press so heavily on the sides of the saw as to cause great friction, and heat the saw to such a degree as to injure it; this will be obviated by guiding the saw by means of the spring G, and the journal box g, the spring being of sufficient strength to prevent end play of the spindle, but at the same time yielding to the lateral pressure caused by the springing of the log will cause the saw to run lighter, will make less noise, and will make a cleaner cut.

I do not claim allowing the saw to have free end play irrespective of the manner in which I control it. But,

What I claim as new in my invention and desire to secure by Letters Patent is—

1. The springs G and G' carrying the journal boxes g, and g' attached and arranged in the manner substantially as herein described, for the purpose of guiding the saw but at the same time allowing a sufficient degree of end play to the spindle, to admit of its accommodating itself to the lateral springing of the log.

2. Arranging the saw N, and its spindle M on the swinging frame H, H, which is adjustable so as to bring the saw N, in any required position in a line forming part of a circle around the axis of the saw D, and adjusting the said saw N, either in a line with or to the right or left, of the saw D, by means of the slot in the spring G' through which the bolt b, passes, in the manner herein described or in any manner substantially the same.

O. CHILD.

Witnesses:
 GEORGE PERRY,
 JAMES TODD.